US009836228B2

(12) United States Patent
Tasler

(10) Patent No.: US 9,836,228 B2
(45) Date of Patent: *Dec. 5, 2017

(54) ANALOG DATA GENERATING AND PROCESSING DEVICE HAVING A MULTI-USE AUTOMATIC PROCESSOR

(71) Applicant: Papst Licensing GmbH & Co. KG, St. Georgen (DE)

(72) Inventor: Michael L. Tasler, Wurzburg (DE)

(73) Assignee: Papst Licensing GmbH & Co. KG, St. Georgen (DE)

( * ) Notice: Subject to any disclaimer, the term of this patent is extended or adjusted under 35 U.S.C. 154(b) by 222 days.

This patent is subject to a terminal disclaimer.

(21) Appl. No.: 14/859,266

(22) Filed: Sep. 19, 2015

(65) Prior Publication Data

US 2016/0162204 A1    Jun. 9, 2016

Related U.S. Application Data

(60) Continuation of application No. 12/891,443, filed on Sep. 27, 2010, now Pat. No. 8,504,746, which is a
(Continued)

(30) Foreign Application Priority Data

Mar. 4, 1997    (DE) .................. 197 08 755

(51) Int. Cl.
*G06F 3/00* (2006.01)
*G06F 13/28* (2006.01)
(Continued)

(52) U.S. Cl.
CPC .......... *G06F 3/0613* (2013.01); *G06F 3/0605* (2013.01); *G06F 3/0607* (2013.01);
(Continued)

(58) Field of Classification Search
CPC .... G06F 3/0605; G06F 3/0613; G06F 3/0664; G06F 13/385; G06F 3/0607; G06F 13/387; G06F 3/0676; G06F 3/0661
(Continued)

(56) References Cited

U.S. PATENT DOCUMENTS 4,466,573 A    8/1984    Camboulives et al.
4,853,844 A    8/1989    Kono
(Continued)

FOREIGN PATENT DOCUMENTS

AT    390 332 B    4/1990
AT    390332    4/1990
(Continued)

OTHER PUBLICATIONS

Friedhelm Schmidt, The SCSI Bus and IDE Interface Book, Jun. 17, 1995.
(Continued)

*Primary Examiner* — Chun-Kuan Lee
(74) *Attorney, Agent, or Firm* — Schmeiser, Olsen & Watts LLP; Anthony L. Meola, Esq.

(57) ABSTRACT

An interface device (10) provides fast data communication between a host device with input/output interfaces and a data transmit/receive device, wherein the interface device (10) comprises a processor means (13), a memory means (14), a first connecting device (12) for interfacing the host device with the interface device, and a second connecting device (15) for interfacing the interface device (10) with the data transmit/receive device. The interface device (10) is configured by the processor means (13) and the memory means (14) in such a way that, when receiving an inquiry from the host device via the first connecting device (12) as to the type of a device attached to the host device, regardless of the type of the data transmit/receive device, the interface device
(Continued)

sends a signal to the host device via the first connecting device (12) which signals to the host device that it is communicating with an input/output device.

48 Claims, 2 Drawing Sheets

Related U.S. Application Data continuation of application No. 11/467,092, filed on Aug. 24, 2006, now Pat. No. 9,189,437, which is a continuation of application No. 11/467,073, filed on Aug. 24, 2006, now Pat. No. 8,966,144, which is a continuation of application No. 11/078,778, filed on Mar. 11, 2005, now abandoned, and a continuation of application No. 10/219,105, filed on Aug. 15, 2002, now Pat. No. 6,895,449, which is a division of application No. 09/331,002, filed as application No. PCT/EP98/01187 on Mar. 3, 1998, now Pat. No. 6,470,399.

(51) Int. Cl.
  *G06F 13/12* (2006.01)
  *G06F 13/38* (2006.01)
  *G06F 3/06* (2006.01)
(52) U.S. Cl.
  CPC ............ *G06F 3/068* (2013.01); *G06F 3/0661* (2013.01); *G06F 3/0664* (2013.01); *G06F 3/0676* (2013.01); *G06F 13/385* (2013.01); *G06F 13/387* (2013.01)
(58) Field of Classification Search
  USPC .............................................. 710/15, 63, 22
  See application file for complete search history.

(56) References Cited

U.S. PATENT DOCUMENTS

| | | |
|---|---|---|
| 4,896,262 A | 1/1990 | Wayama et al. |
| 5,231,501 A | 7/1993 | Sakia |
| 5,291,584 A | 3/1994 | Challa et al. |
| 5,402,170 A | 3/1995 | Parulski et al. |
| 5,463,772 A | 10/1995 | Thompson et al. |
| 5,479,206 A | 12/1995 | Ueno et al. |
| 5,499,378 A | 3/1996 | McNeill |
| 5,506,692 A | 4/1996 | Murata |
| 5,508,821 A | 4/1996 | Murata |
| 5,532,825 A | 7/1996 | Lim et al. |
| 5,570,146 A | 10/1996 | Collette |
| 5,619,659 A | 4/1997 | Kikinis et al. |
| 5,628,028 A | 5/1997 | Michelson |
| 5,634,074 A | 5/1997 | Devon et al. |
| 5,724,155 A | 3/1998 | Saito |
| 5,742,934 A | 4/1998 | Shinohara |
| 5,758,081 A | 5/1998 | Aytac |
| 5,802,325 A | 9/1998 | Le Roux |
| 5,806,072 A | 9/1998 | Kuba et al. |
| 5,815,201 A | 9/1998 | Hashimoto et al. |
| 5,815,205 A | 9/1998 | Hashimoto et al. |
| 5,848,420 A | 12/1998 | Xu |
| 5,915,106 A | 6/1999 | Ard |
| 5,917,545 A | 6/1999 | Kowno et al. |
| 5,969,750 A | 10/1999 | Hsieh |
| 5,974,161 A | 12/1999 | Endsley et al. |
| 6,005,613 A | 12/1999 | Endsley et al. |
| 6,088,532 A | 7/2000 | Yamamoto et al. |
| 6,111,604 A | 8/2000 | Hashimoto et al. |
| 6,163,344 A | 12/2000 | Kawamura et al. |
| 6,256,452 B1 | 7/2001 | Yamamoto |
| 6,344,875 B1 | 2/2002 | Hashimoto et al. |
| 6,654,050 B2 | 11/2003 | Karube et al. |
| 6,670,985 B2 | 12/2003 | Karube et al. |
| 7,046,276 B2 | 3/2006 | Hashimoto et al. |
| 2001/0050711 A1 | 12/2001 | Karube et al. |

FOREIGN PATENT DOCUMENTS

| | | |
|---|---|---|
| DE | 36 24 373 A1 | 1/1987 |
| DE | 3624373 A1 | 1/1987 |
| DE | 8815936 U1 | 2/1989 |
| DE | 8815936 U1 | 3/1989 |
| DE | 41 37 928 A1 | 5/1992 |
| DE | 4137928 A1 | 5/1992 |
| DE | 19528889 A1 | 2/1997 |
| EP | 0 033 044 A1 | 8/1981 |
| EP | 0033044 | 8/1981 |
| EP | 0229700 | 7/1987 |
| EP | 0259786 | 3/1988 |
| EP | 0391157 | 10/1990 |
| EP | 0685799 A1 | 6/1995 |
| EP | 0705037 A2 | 3/1996 |
| EP | 0705037 A2 | 3/1996 |
| JP | 53-145535 | 12/1978 |
| JP | 61-034652 | 2/1986 |
| JP | 61-060164 | 3/1986 |
| JP | 63-133204 | 6/1988 |
| JP | 01-293404 | 11/1989 |
| JP | H01-303554 | 12/1989 |
| JP | 02-051727 | 2/1990 |
| JP | 2051727 | 2/1990 |
| JP | 02-114351 | 4/1990 |
| JP | 03-246654 | 11/1991 |
| JP | H4-15853 | 1/1992 |
| JP | H4-15853 A | 1/1992 |
| JP | 02-51727 A | 2/1992 |
| JP | 04-213715 A | 4/1992 |
| JP | 04-133152 | 5/1992 |
| JP | 04-309156 | 10/1992 |
| JP | 04-309156 A | 10/1992 |
| JP | 6-52087 A | 2/1994 |
| JP | 06-52087 A | 2/1994 |
| JP | 06-067815 | 3/1994 |
| JP | 06-083917 | 3/1994 |
| JP | 06-83917 A | 3/1994 |
| JP | 06-090423 | 3/1994 |
| JP | H06-165393 | 6/1994 |
| JP | 06-301607 | 10/1994 |
| JP | 07-44290 | 2/1995 |
| JP | 07-177406 A | 7/1995 |
| JP | 07-202982 | 8/1995 |
| JP | H8-30742 | 2/1996 |
| JP | H8-30742 A | 2/1996 |
| JP | 08-110883 | 4/1996 |
| JP | 08-130702 | 5/1996 |
| JP | 08-130702 A | 5/1996 |
| JP | 08-191375 | 7/1996 |
| JP | 08-191410 A | 7/1996 |
| JP | 08-191412 | 7/1996 |
| JP | 08-223341 | 8/1996 |
| JP | 08-223341 A | 8/1996 |
| JP | 08-328990 A | 12/1996 |
| JP | 09-016506 | 1/1997 |
| JP | 09-091237 | 4/1997 |
| JP | 10-177535 | 6/1998 |
| WO | 91/02212 | 2/1991 |
| WO | 94/27223 | 11/1994 |
| WO | 96/27159 | 9/1996 |

OTHER PUBLICATIONS

Nikon, Nikon Digital Camera E100 User's Manual, Nov. 1, 1996.
Gradient Technology, Inc., Desklab 216 User Manual, 1992.
Analogic Corp., DASM-FGM Brochure, 1992.
Paul K. Gallagher, "Vision Systems for Quality Control," ISBN # 0-7803-2639-3, Northcon95; IEEE Technical Applications Conference and Workshops Northcon95, pp. 381-388, Nov. 12, 1995.
Kodak, Kodak DCS200 camera user manual, 1992-1993.
Kodak, Kodak DC25 camera user manual, 1996.

(56) References Cited

OTHER PUBLICATIONS

Thomas L. Davis, "The Path to a Custom Lab is Through a PC and an External Interface," Research & Development, Apr. 1985.
Kodak, User's Manual EOS-DCS 1, 3 and 5 Digital Cameras, 1997.
Kodak, User's Manual Kodak Professional Digital Camera System, 1991.
Analogic Corp., "14-Bit, 2 MHZ A-to-D SCSI Substation for the Most Demanding Data Acquisition Applications," Analogic, Bulletin No. 16-100452 Rev 0 3/92 xM, 1992.
ABC's pf PCMIA—General Information, SanDisk Corporation, Jul. 10, 2008.
ABC's pf PCMIA—Technical Information, SanDisk Corporation, Jul. 10, 2008.
About the SCSI Manager, Apple Computer, Inc. Jul. 3, 1996.
About Twain, Twain Working Group, Aug. 20, 2007.
Accredited Standard Committee X3, information Technology, Jul. 24, 1996.
Advanced MS-DOS, Ray Duncan 1986.
Advancing the Art of Industrial Video Imaging: CCD Cameras and Frame Grabbers, John Gallant Jan. 18, 1996.
An Automatic Data Acquisition System for 3D Reconstruction in Echocardiography, Michael Tasler, 1995.
An Industry First, TROY Group's NetSend Makes up to 9 Million, Business Wire 1999.
About the SCI Manager, Apple Computer, Inc., 2007.
Applications Overview, SanDisk Corporation, Jul. 10, 2008.
14-Bit, 2 MHz A-to-D SCSI Substation, Analogic Corporation, 1992.
22C-18, Lecture 37, Fall 1996—Disk Interfaces (Jones).
32 MByte High Performance Solid State Disk (Unno et al.), Apr. 1996.
ABCs of PCMCIA—Flash Disk Information, SanDisk Corporation, Jul. 10, 2008.
A MegaPixel Camera with SCSI Interface (Gallagher), May 1995.
A Mega-Pixel Resolution PC Digital Still Camera (Chan), Jan. 1996.
A Segmental Approach to Automatic Language Identification, Muthusamy, 1987.
A Testbed for Mobile Networked Computing (Agrawal), Feb. 1995.
A user-friendly interface adapter, Jonathan Bowen, 1985.
Beginning Unix, Wiley Publishing, Inc.; Love et al.; 2005.
Canon Becomes World's First Imaging Company to Offer SanDisk CompactFlash as Digital Film, Sandisk Corporation, Jun. 18, 1996.
CCD Data Acquisitions Systems at Lick and Keck Observatories; Kibrick at el,; 1993.
Cheops: A Reconfigurable Data-Flow System for Video Processing; Bove et al.; Apr. 1995.
Clarification to the Plug and Play ISA Specification, Version 1.0a; Dec. 10, 1994.
Computer Dictionary, Second Edition; Microsoft Press; 1994.
Optical Server Uses Network Protocols for Plug-and-Play Integration; Computer Technology Review; Dec. 1993.
Designing Control Units That Interface Peripherals to the IBM I/O Channel; Computer Technology Review; Jan. 31, 1989.
Configuring Your System for the FlashDrive; Flashdrive Application Note.
Consumer Applications of the IEEE 1394 Serial bus, and a 13994/DV Video Editing System; Wetzel et al.; 1996.
16 & 18 Bit, Stereo A/D Converters for Digital Audio; Crystal Semiconductor Corporation.
Digital Video Camera Recorder Manual DCR-VX 1000, Sony Corporation; 1995.
DCS 200 AC Power Adapter Technical Information, Kodak Jun. 2000.
Derived Virtual Devices; A Secure Distributed File System Mechanism; Van meter, et al,; Sep. 17, 1996.
Design and Construction of a Universal Data Acquisition and Control System for Scanning Probe Mircoscopy; Michael Tasler; 1996.

Design and Implementation of the MTX Operating System, K.C. Wang; 2015.
DeskLab 216 User Manual; Gradient Technology, Inc.; 1992.
Development of a Large Vocabulary Speech Database for Cantonese; Ching et al.; 1997.
Device Class Definition for Human interface Devices (HUD); USB Implementers' Forum; 1997.
Innovations Light Fuse Under Flash Memory; Samuel Weber; 1995.
Digidesign 882/20 I/O Audio Interface Installation Guide; Digidesign inc.; 1999.
Digital Camera Compatibility List; ScanDisk; Oct. 29, 1997.
Digital Cameras Give Your Documents Snap; Michael J. Himowitz; Feb. 17, 1997.
Digitizing Hardware.
Desk Lab; Phil Lapsey Sep. 9, 1993.
The Advances SCSI Programming interface; Dr. Dobb's Journal; Mar. 1994.
EOS DCS 1 User Maual; Eastman Kodak Company; 1997.
Easy to Use Flash Memory Modules Emulate Disk Drives; Gary Legg; Sep. 1, 1994.
New Techniques for High-Speed Data Acquisition; Tatkow, et al; Electronic Engineering; Sep. 1990.
Emerging High Speed Local Area networks and Wide Area Networks; Annamalai, Oct. 1995.
Raymond W. Simpson; High Performance, Dual Speed CCD Camera System; SPIE vol. 2654; 1996.
Yamashina et al.; High Quality Digital Camera; ITE Technical Report vol. 20 No. 58, pp. 75-78: Nov. 1996.
Tom Williams; Host-Access Standardization Efforts Ready SCSI for Widespread Use; Computer Design. 28 n5; Mar. 1, 1989.
HP and Troy Group Extend Jet Send Protocol; Business Wire, Inc. Feb. 8, 2000.
HP Introduces JetSend for Pocket PC; Business Wire, Inc. Apr. 25, 2000.
Bob Chalstrom; HP Jetlag Interface for Macintosh; Feb. 13, 1987.
HP Photosmart digital camera accessories list; Jun. 17, 2008.
HP Photosmart Digital Camera; how it works; Jun. 17, 2008.
HP Photosmart Digital Camera—Product Overview; Jun. 17, 2008.
HP Photosmart Digital Camera—Product Specifications; Jun. 17, 2008.
HP Photosmart Digital Camera—What Ships in the Box; Jun. 17, 2008.
HP Photosmart Digital Camera C20/C30/C200 TWAIN—Product Overview; Jun. 17, 2008.
Jim Sogas; Flash-based PCMCIA cards: Computer Design's OEM Integration; Sep. 1994.
SanDisk FAQ's; Jul. 10, 2008.
Fujix; Photograb SP-MA.
Peter Clark; Two European vendors Roll Peripheral ICs; Electronic Engineering Times, n 298; Nov. 18, 1996.
SanDisk ABC's of PCMCIA; Oct. 29, 1997.
IEEE; Network Independent Standard for Smart Transducers,University of Colorado; Aug. 12, 2009.
Kane B. Lee; IEEE, Standardized Approach for Transducer Interfacing; US Department of Commerce; Oct. 1996.
Paul Conway; IEEE An Interpretation and Example Implementation; 2000.
Robert N. Johnson; Building Plug and Play Networked Smart Transducers; Sensors Magazine, Aug. 12, 2009.
Richard L. Fischer; The PCImicro MCU; Microchip Technology, Inc.; 2000.
Stan P. Woods; IEEE Smart Transducer Interface Module.
Smart Transducer Module; Cognisense, Telemonitor, Inc. Feb. 9, 2000.
IEEE Compcon 97; IEEE Computer Society Press Feb. 23, 1997.
HJW Spoekler; IEEE Explore; REal-time data acquisition within a standard Unix environment; Feb. 29, 2009.
A SCSI Based Real Time Data Acquisition Solution for UNIX and VMA; IEEE Signal Processing Magazine, vol. 9, No. 1; Jan. 1992.
IEEE Standard for High Performance Serial Bus; 1996.
IEEE Standard for Simple 32-Bit Backplane; Aug. 8, 1998.
H. Muller; The CHI a New Fastbus Interface and Processor; IEEE Transactions on Nuclear Science, vol. 37, No. 2; Apr. 1990.

(56) References Cited

OTHER PUBLICATIONS

R.A. Berkoff; Direct Access Storage Device/Small Computer System Interface Device Support for OS/2; IBM Technical Disclosure Bulletin; vol. 37, No. 8, Aug. 1994.
Sony Semiconductor; IEEE 1394 New Interface for the Digital Network Age; Apr. 16, 2008.
Gary Hoffman; IEEE 1394, the AV Digital Interface of Choice; Jan. 1996.
Kang Lee; The Proposed Smart Transducer Interface Standard; May 18, 1998.
Stan P. Woods; IEEE P1451 Transducer to Microprocessor Interface; Sensors, Jun. 1996.
Hideki Mimura; Image Data File for Memory Card Camera; Toshiba Corporation; ITEC 1990.
Image File.
Image of Hewlett Packard 88396.
E. Reig; Improved Design Avoid Bottlenecks; West Germany Journal—Paper; Sep. 29, 1989.
Inside Macintosh; Devices; Apple Computer, Inc.; 1994.
Inside Macintosh; Files; Apple Computer, Inc.; 1992.
SanDisk Corporation; Jul. 10, 2008.
Dave Bursky; Inter-System Communications standard to Ease Clustered System Implementation; ISSN, No. 22, vol. 45; p. 32; Oct. 13, 1997.
Kazuhito Okuda; Introduction to Macintosh Sound; SPEC.
Reinhardt Krause; I/O river Spec; Electronic News; Jan. 29, 1996.
Alex Pournelle; Jetsend Technology Allows Connectivity; Computer Technology Review; Jul. 1999.
Power Manager Reference, Chapter 6, 2 pages.
Staff, Nomad, "PowerBook Manual for Beginner Users," Shinsei Publishing Co., Ltd., Jun. 25, 1994, 8 pages.
Press Releases, SanDisk Corporation, Jul. 10, 2008, 2 pages.
Francis, J.L., et al., "Principles of interfacing computers to medical equipment," Baillière's Clinical Obstetrics and Gynaecology, vol. 4, No. 4, Dec. 1990, 9 pages.
Prior Art Claim Chart, A110 DeskLab Product, 23 pages.
Prior Art Claim Chart U.S. Pat. No. 6,470,399 and U.S. Pat. No. 5,570,146, 14 pages.
Pro Tools 4.0.1 NuBus Systems Compatibility, 3 pages.
Sheppard, Jr., Norman F., et al., "Engineering Advances: New Opportunities for Biomedical Engineers," Proceedings of the 16th Annual International Conference of the IEEE Engineering in Medicine and Biology Society, vol. 16, Nov. 3-6, 1994, 5 pages.
Gallagher, Paul, "A MegaPixel Camera With SCSI Interface," Proceedings of the International Robots & Vision Automation Conference, May 9-11, 1995, 7 pages.
Q-EZ, 4 pages.
Macintosh Quadra 700, Developer Note, Developer Technical Publications, Apple Computer, Inc., 1991, 7 pages.
Drucker, David L., et al., "QuickTime Handbook," 1992, 5 pages.
Liquid Crystal Digital Camera QV-10B Owner's Manual, Casio Computer Co., Ltd., 23 pages.
Digital Camera Club, QV-30, QV-300, ASCII, vol. 21, Casio Computer Co., Ltd., Jan. 1, 1997, 4 pages.
QV-Link, Version 2.6, LK-12S for Windows 95, Owner's Manual, Casio Computer Co., Ltd., 69 pages.
Note, S., et al., "Rapid prototyping of DSP systems: requirements and solutions," IEEE 1074-6005, 1995, 9 pages.
Young, Marcus R., et al., "Real-Time Visualisation of Cardiac Arrhythmias," IEEE, Jul. 23, 2009, 2 pages.
Reference—Kodak Driver for Aldus PhotoStyler Software, Eastman Kodak Company, 138 pages.
"Salutation Port-of-Entry Software Lets Application Developers Control Network Peripherals From the Windows Desktop," Business Wire, Jul. 13, 1998, 3 pages.
Differences Between PC Card ATA and CompactFlash(tm), SanDisk Application Note, SanDisk Corporation, 1996, 4 pages.
SanDisk CompactFlash Specification, Interface—PCMCIA PC Card ATA and True IDE Mode System Performance (Notes 1 & 2), SanDisk Corporation, Jul. 10, 2008, 3 pages.

SanDisk FlashChip Set Specification, Interface—PCMCIA PC Card ATA and True IDE Mode System Performance (Notes 1 & 2), SanDisk Corporation, Jul. 10, 2008, 3 pages.
SanDisk IDE FlashChip Specification, Interface—PCMCIA PC Card ATA and True IDE Mode System Performance (Notes 1 & 2), SanDisk Corporation, 3 pages.
SanDisk IDE FlashDrive Specification, Interface—1.3" FlashDrive IDE & 1.8" FalshDrive IDE System Performance (Notes 1 & 2), SanDisk Corporation, 3 pages.
SanDisk Image File, 1 page.
Goligoski, Bob, et al., "SanDisk Introduces Flash Chipset—World's Smallest Embedded Solid-State ATA Data Storage System," SanDisk Corporation, Oct. 15, 1995, 3 pages.
Chan, Nelson, et al., "SanDisk Introduces World's First 85MB Type II Flash Card; More Than Doubles Industry Capacity," SanDisk Corporation, Oct. 30, 1995, 3 pages.
SanDisk Memory Card—Digital Camera Compatibility List, 5 pages.
SanDisk PCMCIA ATA FlashDisk User's Guide, SanDisk Corporation, 3 pages.
SanDisk PCMCIA FlashDisks and Windows 95, 3 pages.
SanDisk Pcmcia Type II FlashDisk Specification 2MB through 85MB Capacities, Interface—PCMCIA PC Card ATA System Performance (Notes 1 & 2), SanDisk Corporation, 4 pages.
SanDisk Pre-Erase Command Application Note, Using the Erase Sector and Write without Erase Commands, SanDisk Corporation, 1996, 3 pages.
SanDisk Product Overview, SanDisk Corporation, 3 pages.
SanDisk Products Specs, SanDisk Corporation, 2 pages.
SanDisk Questions and Answers, SanDisk Corporation, 2 pages.
SanDisk Questions and Answers General, SanDisk Corporation, 7 pages.
Chan, Nelson, et al., "SanDisk to Supply Polaroid with Flash Film for New DC-2000 Digital Camera," SanDisk Corporation, Mar. 11, 1996, 2 pages.
Chan, Nelson, et al., "SanDisk to Supply Sony Electronics With Digital Flash Film for Sale With Sony's New DKC-ID1 Digital Camera," SanDisk Corporation, Aug. 27, 1996, 2 pages.
SanDisk Type III FlashDisk, Interface—PCMCIA PC Card ATA and True IDE Mode System Performance (Notes 1 & 2), SanDisk Corporation, 3 pages.
SanDisk What's New Table of Contents, SanDisk Corporation, 1 page.
Blake, Mark A., Scanworks(tm) for the Mac, User's Guide, SoftStyle, 1987, 95 pages.
SCSI Bus and IDE Interface, pp. 184-301, 119 pages.
DASM-FGM Specification, SCSI Real-Time Video Frame Grabber, Analogic Corporation, 1992, 4 pages.
SCSI-2, (original Japanese, translated, and translated excerpts), 23 pages.
Search the European classification, Espace.net, May 6, 2008, 5 pages.
Sony Handycam DCR-VX1000 Mini DV Digital Camcorder, May 2, 2008, 5 pages.
Isoyama, Yoshikazu, et al., "ISDN Basic Interface for the SUMISATION," Sumitomo Electric, Technical Review, No. 31, Jan. 1991, 7 pages.
Kubo, Naoki, et al., "Super Dynamic Range Image Processing System Using a New Structure CCD," Fuji Film Research & Development, No. 49-2004, 2004, 5 pages.
Johansson, Peter, Working Draft, T10 Project 1155D, Revision 4, "Information technology—Serial Bus Protocol 2 (SBP-2)", May 19, 1998, 107 pages.
Cole, Ronald, et al., "Telephone Speech Corpus Development at CSLU," IEEE, Proceedings of ICSLP-04, Sep. 1994, 4 pages.
Oda, Kazuya, et al., "The Development of Digital Still Camera using 1.3M-Pixel VT-CCD Image Sensor," ITE Technical Report, vol. 19, No. 60, pp. 1-5, Nov. 1995, 5 pages.
Correll, Kenneth W., et al., "The J300 Family of Video and Audio Adapters: Architecture and Hardware Design," Digital Technical Journal, vol. 7, No. 4, 1995, 14 pages.
Naiman, Arthur, et al., "The Macintosh Bible, 4th Edition," 1993, pp. 78-79, 14 pages.

(56) References Cited

OTHER PUBLICATIONS

Infoworld The Voice of Client/Server in the Enterprise; vol. 18, Issue 50; Dec. 9, 1996; 3 pages.
Infoworld The Voice of Client/Server in the Enterprise; vol. 18, Issue 25; Jun. 17, 1996; 5 pages.
DiNucci, Darcy, et al., "The Macintosh Bible, 5th Edition," 1995, pp. 178-181, 215-217, 658-668, 62 pages.
Windows 95 CD-ROM Msdosdrv.txt File (2 of 2); Retrieved from the Internet Aug. 20, 2007; URL: http://support.microsoft.com/kb/q135485; 11 pages.
Windows 95 CD-ROM Msdosdrv.txt File (1 of 2); Retrieved from the Internet Aug. 20, 2007; URL: http://support.microsoft.com/kb/135485; 7 pages.
DiNucci, Darcy, et al., "The Macintosh Bible, 5th Edition," 1995, pp. 216-217, 3 pages.
New Products; Computer; Apr. 1991; pp. 76-78.
Windows XP; FinePixViewer; 22 pages.
Judson, Jeremy, "The Macintosh Bible, 6th Edition," pp. 61-64, 1996, 7 pages.
Windows; Camera User Guide; 23 pages.
Judson, Jeremy, "The Macintosh Bible, 6th Edition," pp. 145-148, 1997, 3 pages.
Kleiman, S. R.; Vnodes: An Architecture for Multiple File System Types in Sun UNIX; 10 pages.
Quinnell, Richard A., "The Mighty Morphin' PCI Bus," EDN, Apr. 25, 1996, 9 pages.
Rieg, Erwin; Verbessertes Konzept vermeidet Engpasse; Bauelemente; Elektronik 20; Sep. 29, 1989; pp. 52-56.
Gadre, Dhananjay V.; Using the Parallel Adapter as a Host Interface Port; Dr. Dobb's Journal; Apr. 1996; 9 pages.
Duncan, Ray, "The MS-DOS Encyclopedia," Microsoft Press, 1988, 161 pages.
Using the DCS 200 Camera with a PC; 148 pages.
Fischer, Richard L., et al., "The PICmicro MCU as an IEEE 1451.2 Compatible Smart Transducer Interface Module (STIM)," Microchip Technology Inc., AN214, 2002, 63 pages.
Cooper, Jim; Special Edition Using MS-DOS 6.22 Third Edition; 3 pages.
Sawert, Brian, "The Advanced SCSI Programming Interface," Dr. Dobb's Journal, Mar. 1994, 8 pages.
User Guide for the SanDisk PC Card ATA FlashDisk Series; 30 pages.
Miller, Sam, et al., "The QuickTime How-To Book," SYBEX, 1993, 36 pages.
Wright, Maury; USB and IEEE 1394: Pretenders, Contenders, or Locks for Ubiquitous Desktop Deployment?; EDN; Apr. 25, 1996; 8 pages.
USB & IEEE 1394, The Technology, ASCII, vol. 21 Mar. 3, 1997, 5 pages.
Wang, James, "Third Party NuBus AV Cards," Feb. 18, 1999, 1 page.
Kletzander, Arno; Untitled; Jul. 3, 2003; 1 page.
Flamingo, Frank G.; UNIX System Administration; 1996; 300 pages.
Third Party Product Announcements, The Florida SunFlash, vol. 61, #2, Jan. 1994, 10 pages.
Thomas, Rebecca et al.; UNIX Administration Guide for System V; 1989; 3 pages.
TRI/+ Program Shippable Products Catalog, Revision 18.0, Digital Equipment Corporation, Oct. 1992, 120 pages.
Universal Serial Bus Mass Storage Class; Dec. 14, 1998; 53 pages.
TWAIN Specification, Release 1.6, TWAIN Working Group Committee, Feb. 5, 1996, 367 pages.
Universal Host Controller Interface (UHCI) Design Guide, Revision 1.1, Intel Corporation, Mar. 1996, 47 pages.
Slater, Michael; Universal Serial Bus to Simplify PC I/O; Microprocessor Report, The Insider's Guide to Microprocessor Hardware; vol. 9, No. 5; Apr. 17, 1995; 5 pages.
Universal Lab Interface User's Manual, Vernier Software & Technology, May 2000, 40 pages.
Universal Serial Bus Specification Revision 1.1; Sep. 23, 1998; 327 pages.
Universal Serial Bus Specification Revision 1.0; Jan. 15, 1996; 268 pages.
Universal Serial Bus, Homestayfinder.com, URL: http://www.homestayfinder.com/Dictionary.apsx?q=Universal_Serial_Bus; Retrieved from the Internet Mar. 19, 2007, 9 pages.
Universal Serial Bus Common Class Specification; Aug. 18, 1998; 16 pages.
Wikipedia; Universal Serial Bus; Retrieved from the Internet Mar. 19, 2007; URL: http://en.wikipedia.org/wiki/USB; 12 pages.
PC97, ASCII, vol. 21, pp. 318, 348, 350-351, 358-359, Jan. 1, 1999, 6 pages.
A78 Prior Art Claim Chart, 21 pages.
A79, Prior Art Claim Chart, 26 pages.
Kioke, Hitoshi, et al., "High Definition Image Capturing Camera HC-1000," ITE Technical Report, vol. 17, No. 16, pp. 57-62, Mar. 1993, 6 pages.
FlashDrive Installation Guide, SanDisk, Jul. 10, 2008, 2 pages.
Kodak Professional DCS 200 Digital Camera, User's Guide, Sep. 1992, 229 pages.
Spragens, John, "Kodak DCS 420 takes photographers out of the darkroom and onto disk," InfoWorld, Feb. 13, 1995, 35 pages.
Kodak DCS—Digital Still SLR camera, Index Page, Oct. 30, 2006, 9 pages.
Kodak Digital Camera System: A New Tool for Photojournalists, Eastman Kodak Company, 8 pages.
Kodak Professional Digital Camera System, Eastman Kodak Company, 1991, 162 pages.
Chan, Nelson, et al., "Kodak Will Market Sandisk's CompactFlash Storage Cards Under Kodak Label A Storage Media for Kodak's New DC25 Camera," SanDisk Corporation, Sep. 12, 1996, 3 pages.
Kodak Professional DSC 200 Digital Camera User's Manual, Eastman Kodak Company, 1993, 140 pages.
Macintosh PowerBook, Jun. 25, 1994, 8 pages.
Macintosh PowerBook 160 and Macintosh PowerBook 180, Apple Computer, Inc., Developer Note, 2000, 11 pages.
Macintosh Quadra 650, Apple Company, Inc., Aug. 20, 2007, 6 pages.
Macintosh SCSI ID, pp. 73-3, 4 pages.
Chan, Nelson, et al., "Matsushita Introduces New Digital Camera That Uses SanDisk's CompactFlash Cards as the Digital Film," SanDisk Corporation, Jan. 16, 1997, 2 pages.
Heiman, Errol, "Maximize Computer Storage With an IPI Controller," Electronic Design, Apr. 13, 1989, 4 pages.
Suyama, Takaaki, et al., "Memory Card Camera and Peripheral Equipments," ITEJ Technical Report, vol. 15, No. 7, pp. 19-24, Jan. 1991, 6 pages.
Short, Kenneth L., "Microprocessors and Programmed Logic," 1981, 13 pages.
Microsoft Extensible Firmware Initiative FAT32 File System Specification, Hardware White Paper, Microsoft Corporation, Version 1.03, Dec. 6, 2000, 34 pages.
Mobile Data Storage & Digital Camera Film Alternatives: CompactFlash(tm) and MiniCard, SanDisk Corporation, Feb. 1996, 10 pages.
Moore, D.J., "Multimedia presentation development using the Audio Visual Connection," IBM Systems Journal, vol. 29, No. 4, 1990, 15 pages.
Applied Computer Science Group, "Multimodal Human Computer Interaction (SFB360)," Oct. 4, 2010, 2 pages.
Wright, Maury, "New Peripheral Interfaces: Fast & Full of Features," EDN, Oct. 12, 1995, pp. 69-81, 8 pages.
Nikon F-801s, N8008s Repair Manual, Nikon Corporation, 58 pages.
Nikon N8008s AF Instruction Manual, Nikon Corporation, 87 pages.
Lang, Michael, "Optical Server Uses Network Protocols for Plug-and-Play Integration," Computer Technology Review, Dec. 1993, pp. 85-86, 88-89, 5 pages.
PC Card Standard, Release 8.1, PCMCIA/JEITA, Dec. 2002, 40 pages.

(56) References Cited

OTHER PUBLICATIONS

PC Card Standard, vol. 2, Electrical Specification, PCMCIA/JEITA, 2002, 302 pages.
PC Card Standard, vol. 3, Physical Specification, PCMCIA/JEITA 2002, 81 pages.
PC Card Standard, vol. 4, Metaformat Specification, PCMCIA/JEITA 2002, 144 pages.
PC Card Standard, vol. 5, Card Services Specification, PCMCIA/JEITA 2002, 240 pages.
PC Card Standard, vol. 6, Socket Services Specification, PCMCIA/JEITA 2002, 167 pages.
PC Card Standard, vol. 7, PC Card ATA Specification, PCMCIA/JEITA 2002, 46 pages.
PC Card Standard, vol. 8, PC Card Host System Specification, PCMCIA/JEITA 2002, 110 pages.
PC Card Standard, vol. 8, PC Card ATA Specification, PCMCIA/JEIDA 1995, 40 pages.
PC Card Standard, vol. 9, Guidelines, PCMCIA/JEITA 2002, 159 pages.
PC Card Standard, vol. 10, Media Storage Formats Specification, PCMCIA/JEITA 2002, 52 pages.
PC Card Standard, vol. 11, XIP Specification, PCMCIA/JEITA 2002, 67 pages.
PC USB, 1394, Interface, Jan. 1997, 25 pages.
PCMCIA PC Card Standard Reciprocal Grant of Immunity and Sublicense, PCMCIA/JEIDA, Aug. 23, 2000, 2 pages.
Anderson, Don, "PCMCIA System Architecture 16-Bit PC Cards, Second Edition," MindShare, Inc., 1995, 79 pages.
Photosmart System, hpNOW, Mar. 18, 1997, 1 page.
Mimura, H., et al., "Memory Card Camera Interface," PI 101, 1991 vol. 46, No. 2, 5 pages.
Pick-Up 0007, 5 pages.
Plattenlaufwerke, Kapitel 3, 144 pages.
Bastiani, Vince, et al., "Plug and Play SCSI Specification, Version 1.0," Adaptec, et al., Mar. 30, 1994, 26 pages.
Plug and Play ISA Specification, Version 1.0a, Intel Corporation, et al., May 5, 1994, 71 pages.
Polaroid Digital Camera PDC-2000, User Guide for Macintosh or Windows applications, Polaroid Corporation, 1996, 142 pages.

ANALOG DATA GENERATING AND PROCESSING DEVICE HAVING A MULTI-USE AUTOMATIC PROCESSOR

CROSS-REFERENCE TO RELATED APPLICATIONS

This application is a continuation of application Ser. No. 11/467,092, filed Aug. 24, 2006, now U.S. Pat. No. 9,189,437, which is a continuation of application Ser. No. 11/078,778, filed Mar. 11, 2005, now expressly abandoned, which is a continuation of application Ser. No. 10/219,105, filed Aug. 15, 2002, now U.S. Pat. No. 6,895,449, which is a divisional of application Ser. No. 09/331,002, filed Jun. 14, 1999, (now U.S. Pat. No. 6,470,399), which is the National Stage of PCT Application No. PCT/EP98/01187, filed Mar. 3, 1998, which claims priority to German Patent Application No. 19708755.8 filed Mar. 4, 1997.

FIELD OF THE INVENTION

The present invention relates to the transfer of data and in particular to interface devices for communication between a computer or host device and a data transmit/receive device from which data is to be acquired or with which two-way communication is to take place.

BACKGROUND OF THE INVENTION

Existing data acquisition systems for computers are very limited in their areas of application. Generally such systems can be classified into two groups.

In the first group host devices or computer systems are attached by means of an interface to a device whose data is to be acquired. The interfaces of this group are normally standard interfaces which, with specific driver software, can be used with a variety of host systems. An advantage of such interfaces is that they are largely independent of the host device. However, a disadvantage is that they generally require very sophisticated drivers which are prone to malfunction and which limit data transfer rates between the device connected to the interface and the host device and vice versa. Further, it is often very difficult to implement such interfaces for portable systems and they offer few possibilities for adaptation with the result that such systems offer little flexibility.

The devices from which data is to be acquired cover the entire electrical engineering spectrum. In a typical case, it is assumed that a customer who operates, for example, a diagnostic radiology system in a medical engineering environment reports a fault. A field service technician of the system manufacturer visits the customer and reads system log files generated by the diagnostic radiology system by means a portable computer or laptop for example. If the fault cannot be localized or if the fault is intermittent, it will be necessary for the service technician to read not only an error log file but also data from current operation. It is apparent that in this case fast data transfer and rapid data analysis are necessary.

Another case requiring the use of an interface could be, for example, when an electronic measuring device, e.g. a multimeter, is attached to a computer system to transfer the data measured by the multimeter to the computer. Particularly when long-term measurements or large volumes of data are involved is it necessary for the interface to support a high data transfer rate.

From these randomly chosen examples it can be seen that an interface may be put to totally different uses. It is therefore desirable that an interface be sufficiently flexible to permit attachment of very different electrical or electronic systems to a host device by means of the interface. To prevent operator error, it is also desirable that a service technician is not required to operate different interfaces in different ways for different applications but that, if possible, a universal method of operating the interface be provided for a large number of applications.

To increase the data transfer rates across an interface, the route chosen in the second group of data acquisition systems for the interface devices was to specifically match the interface very closely to individual host systems or computer systems. The advantage of this solution is that high data transfer rates are possible. However, a disadvantage is that the drivers for the interfaces of the second group are very closely matched to a single host system with the result that they generally cannot be used with other host systems or their use is very ineffective. Further, such types of interface have the disadvantage that they must be installed inside the computer casing to achieve maximum data transfer rates as they access the internal host bus system. They are therefore generally not suitable for portable host systems in the form of laptops whose minimum possible size leaves little internal space to plug in an interface card.

A solution to this problem is offered by the interface devices of IOtech (business address: 25971 Cannon Road, Cleveland, Ohio 44146, USA) which are suitable for laptops such as the WaveBook/512 (registered trademark). The interface devices are connected by means of a plug-in card, approximately the size of a credit card, to the personal computer memory card association (PCMIA) interface which is now a standard feature in laptops. The plug-in card converts the PCMCIA interface into an interface known in the art as Institute of Electrical and Electronics (IEEE) 1284. The said plug-in card provides a special printer interface which is enhanced as regards the data transfer rate and delivers a data transfer rate of approximately 2 MBps as compared with a rate of approx. 1 MBps for known printer interfaces. The known interface device generally consists of a driver component, a digital signal processor, a buffer and a hardware module which terminates in a connector to which the device whose data is to be acquired is attached. The driver component is attached directly to the enhanced printer interface thus permitting the known interface device to establish a connection between a computer and the device whose data is to be acquired.

In order to work with the said interface, an interface-specific driver must be installed on the host device so that the host device can communicate with the digital signal processor of the interface card. As described above, the driver must be installed on the host device. If the driver is a driver developed specifically for the host device, a high data transfer rate is achieved but the driver cannot be easily installed on a different host system. However, if the driver is a general driver which is as flexible as possible and which can be used on many host devices, compromises must be accepted with regard to the data transfer rate.

Particularly in an application for multi-tasking systems in which several different tasks such as data acquisition, data display and editing are to be performed quasi-simultaneously, each task is normally assigned a certain priority by the host system. A driver supporting a special task requests the central processing system of the host device for processor resources in order to perform its task. Depending on the particular priority assignment method and on the driver implementation, a particular share of processor resources is assigned to a special task in particular time slots. Conflicts arise if one or more drivers are implemented in such a way that they have the highest priority by default, i.e. they are incompatible, as happens in practice in many applications. It may occur that both drivers are set to highest priority which, in the worst case, can result in a system crash.

EP 0685799 A1 discloses an interface by means of which several peripheral devices can be attached to a bus. An interface is connected between the bus of a host device and various peripheral devices. The interface comprises a finite state machine and several branches each of which is assigned to a peripheral device. Each branch comprises a data manager, cycle control, user logic and a buffer. This known interface device provides optimal matching between a host device and a specific peripheral device.

The specialist publication IBM Technical Disclosure Bulletin, Vol. 38, No. 05, page 245; "Communication Method between Devices through FDD Interface" discloses an interface which connects a host device to a peripheral device via a floppy disk drive interface. The interface consists in particular of an address generator, an modified frequency modulation (MFM) encoder/decoder, a serial/parallel adapter and a format signal generator. The interface makes it possible to attach not only a floppy disk drive (FDD) but also a further peripheral device to the FDD host controller of a host device. The host device assumes that a floppy disk drive is always attached to its floppy disk drive controller and communication is initiated if the address is correct. However, this document contains no information as to how communication should be possible if the interface is connected to a multi-purpose interface instead of to a floppy disk drive controller.

SUMMARY OF THE INVENTION

It is the object of the present invention to provide an interface device for communication between a host device and a data transmit/receive device whose use is host device-independent and which delivers a high data transfer rate.

The present invention is based on the finding that both a high data transfer rate and host device-independent use can be achieved if a driver for an input/output device customary in a host device, normally present in most commercially available host devices, is utilized. Drivers for input/output devices customary in a host device which are found in practically all host devices are, for example, drivers for hard disks, for graphics devices or for printer devices. As however the hard disk interfaces in common host devices which can be, for example, IBM personal computers (PCs), IBM-compatible PCs, Commodore PCs, Apple computers or even workstations, are the interfaces with the highest data transfer rate, the hard disk driver is utilized in the preferred embodiment of the interface device of the present invention. Drivers for other storage devices such as floppy disk drives, compact disk read-only memory (CD-ROM) drives or tape drives could also be utilized in order to implement the interface device according to the present invention.

As described in the following, the interface device according to the present invention is to be attached to a host device by means of a multi-purpose interface of the host device which can be implemented, for example, as a small computer systems interface (SCSI) interface or as an enhanced printer interface. Multi-purpose interfaces comprise both an interface card and specific driver software for the interface card. The driver software can be designed so that it can replace the basic input/output system (BIOS) driver routines. Communication between the host device and the devices attached to the multi-purpose interface then essentially takes place by means of the specific driver software for the multi-purpose interface and no longer primarily by means of BIOS routines of the host device. Recently however drivers for multi-purpose interfaces can also already be integrated in the BIOS system of the host device as, alongside classical input/output interfaces, multi-purpose interfaces are becoming increasingly common in host devices. It is of course also possible to use BIOS routines in parallel with the specific driver software for the multi-purpose interface, if this is desired.

The interface device according to the present invention comprises a processor means, a memory means, a first connecting device for interfacing the host device with the interface device, and a second connecting device for interfacing the interface device with the data transmit/receive device. The interface device is configured by the processor means and the memory means in such a way that the interface device, when receiving an inquiry from the host device via the first connecting device as to the type of a device attached to the host device, sends a signal, regardless of the type of the data transmit/receive device, to the host device via the first connecting device which signals to the host device that it is communicating with an input/output device. The interface device according to the present invention therefore simulates, both in terms of hardware and software, the way in which a conventional input/output device functions, preferably that of a hard disk drive. As support for hard disks is implemented as standard in all commercially available host systems, the simulation of a hard disk, for example, can provide host device-independent use. The interface device according to the present invention therefore no longer communicates with the host device or computer by means of a specially designed driver but by means of a program which is present in the BIOS system (Basic Input/Output System) and is normally precisely matched to the specific computer system on which it is installed, or by means of a specific program for the multi-purpose interface. Consequently, the interface device according to the present invention combines the advantages of both groups. On the one hand, communication between the computer and the interface takes place by means of a host device-specific BIOS program or by means of a driver program which is matched to the multi-purpose interface and which could be regarded as a "device-specific driver". On the other hand, the BIOS program or a corresponding multi-purpose interface program which operates one of the common input/output interfaces in host systems is therefore present in all host systems so that the interface device according to the present invention is host device-independent.

BRIEF DESCRIPTION OF THE DRAWINGS

In the following, preferred embodiments of the present invention will be explained in more detail with reference to the drawings enclosed, in which.

DETAILED DESCRIPTION OF THE PREFERRED EMBODIMENTS

It should be understood that the title of this section of this specification, namely, "Detailed Description Of The Invention", relates to a requirement of the United States Patent Office, and does not imply, nor should be inferred to limit the subject matter disclosed herein.

Figure 1:
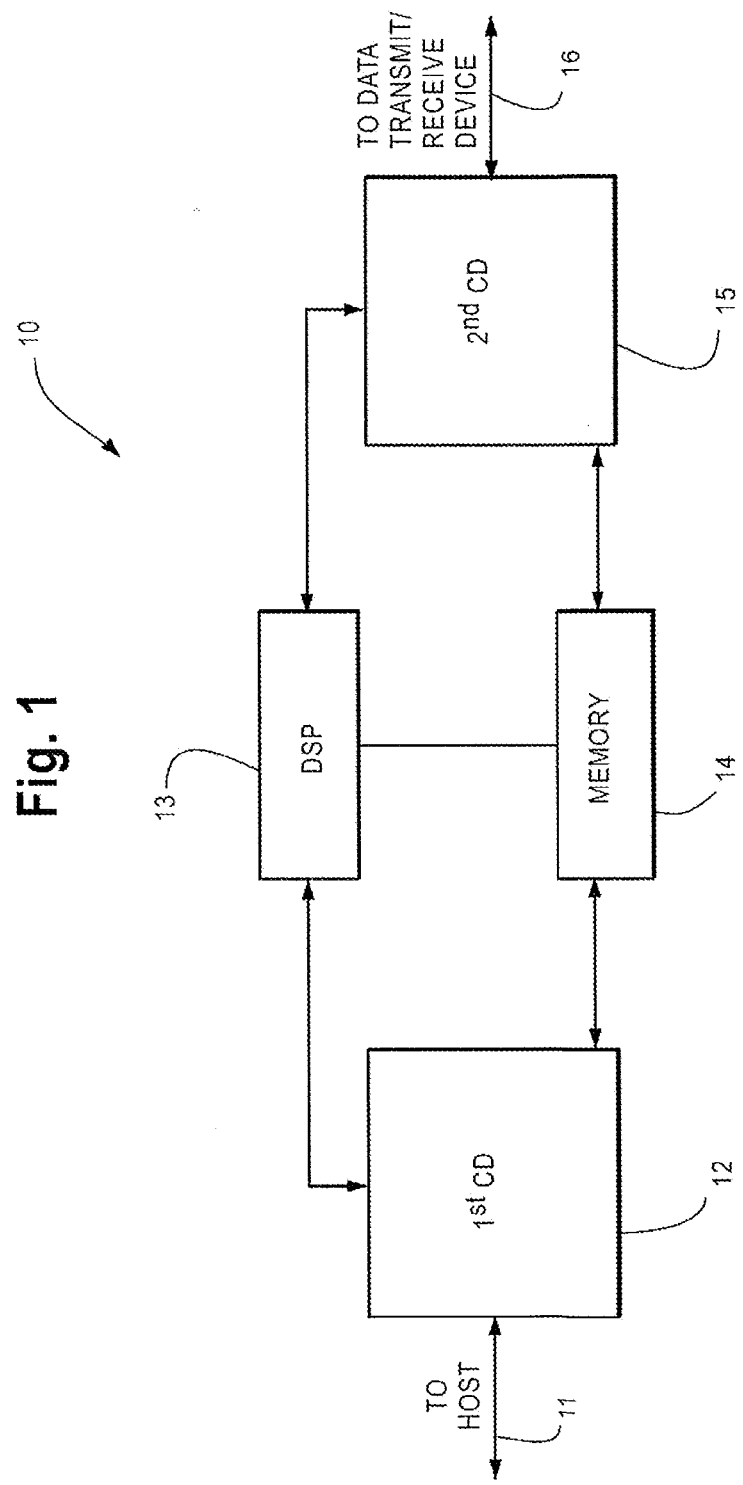
FIG. 1 shows a general block diagram of the interface device according to the present invention.

FIG. 1 shows a general block diagram of an interface device 10 according to the present invention. A first connecting device 12 of the interface device 10 can be attached to a host device (not shown) via a host line 11. The first connecting device is attached both to a digital signal processor 13 and to a memory means 14. The digital signal processor 13 and the memory means 14 are also attached to a second connecting device 15 by means of bi-directional communication lines (shown for all lines by means of two directional arrows). The second connecting device can be attached by means of an output line 16 to a data transmit/receive device which is to receive data from the host device or from which data is to be read, i.e. acquired, and transferred to the host device. The data transmit/receive device itself can also communicate actively with the host device via the first and second connecting device, as described in more detail in the following.

Communication between the host system or host device and the interface device is based on known standard access commands as supported by all known operating systems (e.g. DOS®, Windows®, Unix®). Preferably, the interface device according to the present invention simulates a hard disk with a root directory whose entries are "virtual" files which can be created for the most varied functions. When the host device system with which the interface device according to the present invention is connected is booted and a data transmit/receive device is also attached to the interface device 10, usual BIOS routines or multi-purpose interface programs issue an instruction, known by those skilled in the art as the INQUIRY instruction, to the input/output interfaces in the host device. The digital signal processor 13 receives this inquiry instruction via the first connecting device and generates a signal which is sent to the host device (not shown) again via the first connecting device 12 and the host line 11. This signal indicates to the host device that, for example, a hard disk drive is attached at the interface to which the INQUIRY instruction was sent. Optionally, the host device can send an instruction, known by those skilled in the art as "Test Unit Ready", to the interface device to request more precise details regarding the queried device.

Regardless of which data transmit/receive device at the output line 16 is attached to the second connecting device, the digital signal processor 13 informs the host device that it is communicating with a hard disk drive. If the host device receives the response that a drive is present, it then sends a request to the interface device 10 to read the boot sequence which, on actual hard disks, normally resides on the first sectors of the disk. The digital signal processor 13, whose operating system in stored in the memory means 14, responds to this instruction by sending to the host device a virtual boot sequence which, in the case of actual drives, includes the drive type, the starting position and the length of the file allocation table (FAT), the number of sectors, etc., known to those skilled in the art. Once the host device has received this data, it assumes that the interface device 10 according to a preferred embodiment of the present invention is a hard disk drive. In reply to an instruction from the host device to display the directory of the "virtual" hard disk drive simulated by the interface device 10 with respect to the host device, the digital signal processor can respond to the host device in exactly the same way as a conventional hard disk would, namely by reading on request the file allocation table or FAT on a sector specified in the boot sequence, normally the first writable sector, and transferring it to the host device, and subsequently by transferring the directory structure of the virtual hard disk. Further, it is possible that the FAT is not read until immediately prior to reading or storing the data of the "virtual" hard disk and not already at initialization.

In a preferred embodiment of the present invention, the digital signal processor 13, which need not necessarily be implemented as a digital signal processor but may be any other kind of microprocessor, comprises a first and a second command interpreter. The first command interpreter carries out the steps described above whilst the second command interpreter carries out the read/write assignment to specific functions. If the user now wishes to read data from the data transmit/receive device via the line 16, the host device sends a command, for example "read file xy", to the interface device. As described above, the interface device appears to the host device as a hard disk. The second command interpreter of the digital signal processor now interprets the read command of the host processor as a data transfer command, by decoding whether "xy" denotes, for example, a "real-time input" file, a "configuration" file or an executable file, whereby the same begins to transfer data from the data transmit/receive device via the second connecting device to the first connecting device and via the line 11 to the host device.

Preferably, the volume of data to be acquired by a data transmit/receive device is specified in a configuration file described in the following by the user specifying in the said configuration file that a measurement is to last, for example, five minutes. To the host device the "real-time input" file then appears as a file whose length corresponds to the anticipated volume of data in those five minutes. Those skilled in the art know that communication between a processor and a hard disk consists of the processor transferring to the hard disk the numbers of the blocks or clusters or sectors whose contents it wishes to read. By reference to the FAT the processor knows which information is contained in which block. In this case, communication between the host device and the interface device according to the present invention therefore consists of the very fast transfer of block numbers and preferably of block number ranges because a virtual "real-time input" file will not be fragmented. If the host device now wants to read the "real-time input" file, it transfers a range of block numbers to the interface device, whereupon data commences to be received via the second connecting device and data commences to be sent to the host device via the first connecting device.

In addition to the digital signal processor instruction memory, which comprises the operating system of the digital signal processor and can be implemented as an erasable programmable read-only memory (EPROM) or electrically erasable programmable read-only memory (EEPROM), the memory means 14 can have an additional buffer for purposes of synchronizing data transfer from the data transmit/receive device to the interface device 10 and data transfer from the interface device 10 to the host device.

Preferably, the buffer is implemented as a fast random access memory or random access memory (RAM) buffer.

Further, from the host device the user can also create a configuration file, whose entries automatically set and control various functions of the interface device 10, on the interface device 10 which appears to the host device as a hard disk. These settings can be, for example, gain, multiplex or sampling rate settings. By creating and editing a configuration file, normally a text file which is simple to understand with little prior knowledge, users of the interface device 10 are able to perform essentially identical operator actions for almost any data transmit/receive devices which can be attached to the second connecting device via the line 16, thus eliminating a source of error arising from users having to know many different command codes for different applications. In the case of the interface device 10 according to the present invention it is necessary for users to note the conventions of the configuration file once only in order to be able to use the interface device 10 as an interface between a host device and almost any data transmit/receive device.

As a result of the option of storing any files in agreed formats in the memory means 14 of the interface device 10, taking into account the maximum capacity of the memory means, any enhancements or even completely new functions of the interface device 10 can be quickly implemented. Even files executable by the host device, such as batch files or executable files (BAT or EXE files), and also help files can be implemented in the interface device, thus achieving independence of the interface device 10 from any additional software (with the exception of the BIOS routines) of the host device. On the one hand, this avoids licensing and/or registration problems and, on the other hand, installation of certain routines which can be frequently used, for example an fast Fourier transformation (FFT) routine to examine acquired time-domain data in the frequency domain, is rendered unnecessary as the EXE files are already installed on the interface device 10 and appear in the virtual root directory, by means of which the host device can access all programs stored on the interface device 10.

In a preferred embodiment of the present invention in which the interface device 10 simulates a hard disk to the host device, the interface device is automatically detected and readied for operation when the host system is powered up or booted. This corresponds to the plug-and-play standard which is currently finding increasingly widespread use. The user is no longer responsible for installing the interface device 10 on the host device by means of specific drivers which must also be loaded; instead the interface device 10 is automatically readied for operation when the host system is booted.

For persons skilled in the art it is however obvious that the interface device 10 is not necessarily signed on when the computer system is powered up but that a special BIOS routine or a driver for a multi-purpose interface can also be started on the host device during current operation of the computer system in order to sign on or mount the interface device 10 as an additional hard disk. This embodiment is suitable for larger workstation systems which are essentially never powered down as they perform, e.g. mail functions or monitor processes which run continuously, for example, in multi-tasking environments.

In the interface device according to the present invention an enormous advantage is to be gained, as apparent in the embodiment described in the following, in separating the actual hardware required to attach the interface device 10 to the data transmit/receive device from the communication unit, which is implemented by the digital signal processor 13, the memory means 14 and the first connecting device 12, as this allows a plurality of dissimilar device types to be operated in parallel in identical manner. Accordingly, many interface devices 10 can be connected to a host device which then sees many different "virtual" hard disks. In addition, any modification of the specific hardware symbolized by the second connecting device 15 can be implemented essentially without changing the operation of the interface device according to the present invention. Further, an experienced user can intervene at any time on any level of the existing second connecting device by making use of the above mentioned option of creating a configuration file or adding or storing new program sections for the second connecting device.

An important advantage of the interface device 10 of the present invention is that it also permits extremely high data transfer rates by using, for data interchange, the host device-own BIOS routines which are optimized for each host device by the host device manufacturer or BIOS system manufacturer, or by using driver programs which are normally optimized and included by the manufacturers of multi-purpose interfaces. Furthermore, due to the simulation of a virtual mass storage device, the data is managed and made available in such a way that it can be transferred directly to other storage media, e.g. to an actual hard disk of the host device without, as it were, intervention of the host device processor. The only limitation to long-term data transfer at high speed is therefore imposed exclusively by the speed and the size of the mass storage device of the host device. This is the case as the digital signal processor 13 already formats the data read by the data transmit/receive device via the second connecting device 15 into block sizes suitable for a hard disk of the host device, whereby the data transfer speed is limited only by the mechanical latency of the hard disk system of the host device. At this point, it should be noted that normally data flow from a host device must be formatted in blocks to permit writing to a hard disk and subsequent reading from a hard disk, as known by those skilled in the art.

The said data transfer rate can be increased further by setting up a direct memory access (DMA) or RAM drive in the host system. As those skilled in the art know, the setting up of a RAM drive requires processor resources of the host device, with the result that the advantage of writing the data to a hard disk drive of the host device essentially without the need for processor resources is lost.

As described above, a data buffer can be implemented in the memory means 14 to permit independence in terms of time of the data transmit/receive device attached to the second connecting device from the host device attached to the first connecting device. This guarantees error-free operation of the interface device 10 even for time-critical applications in multi-tasking host systems.

Figure 2:
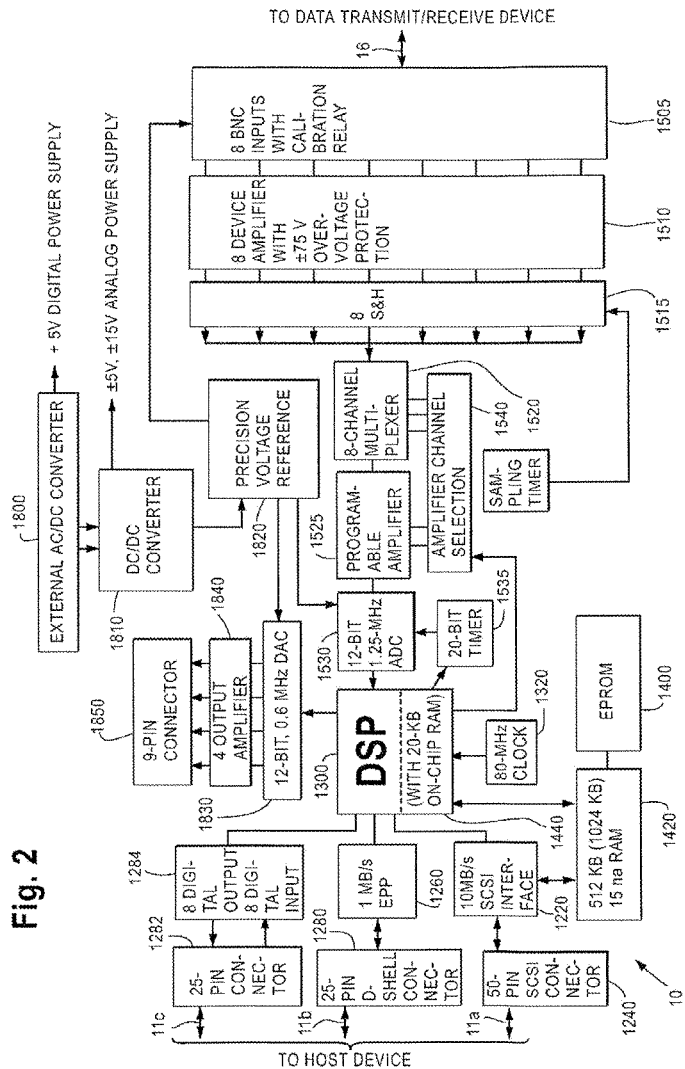
FIG. 2 shows a detailed block diagram of an interface device according to a preferred embodiment of the present invention.

FIG. 2 shows a detailed block diagram of an interface device 10 according to the present invention.

A digital signal processor (DSP) 1300 is, in a manner of speaking, the heart of the interface device 10. The DSP can be any DSP but preferably has a 20-MB on-chip random access memory (RAM). Certain instruction sets, for example, can be stored in the RAM already integrated in the DSP. An 80-MHz clock generator is attached to the DSP 1300 in order to synchronize the DSP. The DSP implements a fast Fourier transformation (FFT) in real time and also optional data compression of the data to be transferred from the data transmit/receive device to the host device in order to achieve greater efficiency and to permit interoperation with host devices which have a smaller memory.

In the preferred embodiment of the interface device 10 shown in FIG. 2, the first connecting device 12 of FIG. 1 contains the following components: an SCSI interface 1220 and a 50-pin SCSI connector 1240 for attachment to an SCSI interface present on most host devices or laptops. The SCSI (small computer system interface) interface 1220 translates the data received via the SCSI connector 1240 into data understood by the DSP 1300, as known by those skilled in the art. Further, the first connecting device 12 comprises an EPP (enhanced parallel port) with a data transfer rate of approx. 1 MBps which delivers a more moderate data transfer rate of 1 MBps by comparison to the data transfer rate of 10 MBps of the SCSI interface. The EPP 1260 is connected to a 25-pin D-shell connector 1280 to permit attachment to a printer interface of a host device for example. Optionally, the first connecting device 12 also comprises a 25-pin connector 1282 which permits the attachment of 8 digital outputs and 8 digital inputs 1284 at a host device.

Preferably, the second connecting device comprises 8 BNC inputs with the calibration relay 1505, a block 1510 with 8 device amplifiers with an overvoltage protection of ±75 V, this block being connected in turn to 8 sample/hold (S&H) circuits 1515. The calibration relays are relays which permit controlled changeover between a test voltage and a calibration reference voltage. Each sample/hold circuit is connected to a corresponding input of an 8-channel multiplexer 1520 which feeds its output signals via a programmable amplifier 1525 into an analog/digital converter (ADC) with 12 bit and 1.25 MHz 1530 and to the DSP 1300. The ADC 1530 is controlled by means of a 20-bit timer 1535, as known by persons skilled in the art. The programmable amplifier 1525 and the 8-channel multiplexer 1520 are controlled via an amplifier channel selection circuit 1540 which is in turn controlled by the DSP 1300.

The complete interface device 10 is supplied with power by an external alternating current to direct current (AC/DC) converter 1800 which delivers a digital supply voltage of ±5 V and is attached to a direct current to direct current (DC/DC)converter 1810 which can deliver analog supply voltages of ±5 V and ±15 V as required for the interface device 10. Further, the direct current to direct current (DC/DC) converter controls a precision voltage reference 1820 which controls the 8 Bayonet Neill Concelman (BNC) inputs 1505 and the ADC 1530 as well as a digital/analog converter (DAC) 1830 which permits, via an output amplifier block with 4 output amplifiers 1840 and a 9-pin connector 1850, analog output direct from the DSP 1300 to an output device, e.g. printer device or monitor device, which can be attached via the 9-pin connector 1850, thus providing the option of monitoring the data transferred to the host device or also, for example, of viewing an FFT to obtain rapid and comprehensive data analysis without using processor time of the host device.

In FIG. 2 the memory means 14 of FIG. 1 is implemented by an EPROM 1400 which, in a preferred embodiment of the present invention, contains the operating system of the digital signal processor 1300. A random access memory with an access time of 15 ns and a size of 512 KB or optionally 1024 KB 1420 serves as a data buffer to achieve independence in terms of time of the output line 16 from the output lines 11a, 11b and 11c to the data transmit/receive device and to the host device respectively. As described above, in a preferred embodiment of the present invention the digital signal processor 1300 already contains a 20-KB on-chip RAM 1440 which can store certain instruction sets, functions and also smaller application software units.

The connection, symbolized by the line 16, of the interface device 10 to any data transmit/receive device implements, by means of the blocks 1505-1535, an analog input with a sampling rate of 1.25 MHz and quantization of 12 bits. There are 8 channels with an overvoltage protection of ±75 V. By means of the programmable amplifier 1525 the channels can be programmed independently of each other in voltage ranges up to a maximum of ±10 V. Unused channels can be grounded internally to reduce channel intermodulation. The block 1515 is implemented as a monolithic high-precision, high-speed sample/hold amplifier for simultaneous sampling of all channels. The precision voltage reference 1820 provides a high-precision, temperature-compensated monolithic energy gap voltage reference for auto-calibration of each channel and each gain. Further, offset fine adjustment for each channel is implemented by the same.

The blocks 1830, 1840 and 1850 implement a direct analog output for the digital signal processor 1300, and the DAC 1830 provides a data transfer rate of 625 kHz and a quantization of 12 bits. The block 1840 comprises 4 channels with a common output latch.

Further, the interface device 10 comprises a digital input/output device implemented by the blocks 1284 and 1282. Here there are 8 digital inputs, 8 digital outputs with a common latch, and the digital port can be attached preferably to a side panel of the interface device 10 so that the port itself can easily be accessed.

The digital signal processor 1300 provides on-board digital data processing. In particular, it is a high-performance DSP with a clock speed of 80 MHz and a 20-bit timer 1535.

As described above, the first connecting device 12 comprises the SCSI interface 1220 with a peak transfer rate of 10 MBps. An optional PCMCIA-to-SCSI adapter permits high-speed communication with laptop computers which are desirable and in widespread use, particularly by mobile service technicians. The EPP 1260 with its associated connector 1280 permits data transfer at a more moderate rate.

As described above, the interface device 10 is supplied with power by means of an external AC/DC adapter which has a universal power input (85-264 VAC, 47-63 Hz). Interference suppression complies with the standards EN 55022, curve B and FFC, Class B. Further, it is also in accordance with international safety regulations TuV (Technischer Überwachongsverein), UL (Underwriters Laboratories), CSA (Canadian Standard Association). The interface device 10 is externally shielded and achieves a value of 55 dB at 30-60 MHz and a value of approximately 40 dB at 1 GHz, and therefore complies with the military standards (MILSTD) 285-1 standard.

As described above, communication between the host device and the multi-purpose interface can take place not only via drivers for input/output device customary in a host device which reside in the BIOS system of the host device but also via specific interface drivers which, in the case of SCSI interfaces, are known as multi-purpose interface ASPI (advanced SCSI programming interface) drivers. This ASPI driver, which can also be referred to as an ASPI manager, is specific to a special SCSI host adapter, i.e. to a special multi-purpose interface, and is normally included by the manufacturer of the multi-purpose interface. Generally speaking, this multi-purpose interface driver has the task of moving precisely specified SCSI commands from the host system program to the host system SCSI adapter. For this reason, the command set is almost identical to that of the SCSI interface itself. Essentially, only status and reset commands for the host adapter have been added.

The ASPI driver can be used if the hard disk was not already addressable at boot time or if the SCSI-related BIOS routines of the host computer were still disabled. Here too, the steps needed to initialize the interface device, preferably as a virtual hard disk, are similar to the steps taken when initializing at boot time.

In general terms, the ASPI manager comprises two sides. One side is the proprietary, hardware-oriented side. It is responsible for converting all commands into a form required by the corresponding multi-purpose interface. The hardware-oriented side of the ASPI driver is therefore matched to a very specific type of multi-purpose interface or SCSI interface. The other side is known as the user software side. This side is totally independent of the proprietary operating characteristics of the SCSI adapter and is therefore identical for all SCSI interfaces. This permits SCSI programming which is however independent of the individual SCSI adapter types.

In contrast to communication between the host device and the interface device according to the present invention on the basis of a BIOS driver, the use of such an ASPI driver for communication between the host device and the interface device according to the present invention allows various further possibilities of the SCSI multi-purpose interface to be exploited. In the case described above, the interface device which preferably signs on and behaves as a virtual hard disk is detected by the BIOS driver of the host computer at boot time and is configured as a hard disk. This step does not however support active requests sent by the interface device to the host computer. If however the virtual hard disk wishes to write data actively to, for example, a hard disk of the host computer or wishes to initiate communication with the processor of the host computer, the host computer must recognize the request of the virtual hard disk and tolerate a further issuer of instructions on its bus. If the interface device behaves solely like a virtual hard disk, it would always receive and never issue commands. The BIOS has no objections to an additional issuer of commands that actively wishes to place data on the bus of the host device but the BIOS does not support the host device in recognizing corresponding requests of the interface device or in granting the interface device permission to access the bus.

Using the ASPI manager the interface device according to the present invention can now obtain active access to an SCSI hard disk of the host device connected to the same SCSI bus which, in contrast to the interface device, cannot be a virtual but a real SCSI mass storage device or also a further interface device according to the present invention. Thereupon, the interface device according to the present invention can write the desired data to the SCSI hard disk of the host computer totally independently of the host computer or can communicate with the same in some other manner. The interface device according to the present invention therefore initially behaves passively as a virtual hard disk and then, as required and using the driver software for the multi-purpose interface, actively on the same SCSI bus. This means however that the interface device according to the present invention, using a driver software for the multi-purpose interface which comprises the BIOS routines customary in host devices and simultaneously provides the option of active participation, can, regardless of the type of the data transmit/receive device attached to the second connecting device, behave initially as a virtual and at the same time passive hard disk but can, as required, participate actively on the bus so as to be able to initiate communication directly with other SCSI hard disks of the host device by bypassing the processor of the host device.

Using a standard interface of a host device, the interface device according to the present invention permits communication with any host device. By simulating an input/output device to the host device and, in a preferred embodiment, by simulating a virtual mass storage device, the interface device 10 is automatically supported by all known host systems without any additional sophisticated driver software. The simulation of a freely definable file structure on the "virtual" hard disk provides simple operation and expansion options and, through the implementation of any programs, independence from special software implemented on the host device. Help files included on the interface device 10 and plug-and-play support ensure ease of use even in portable, flexible host devices. Despite the very simple user interface, experienced users are free at any time to intervene in the functions of the interface device 10 on system level. The interface device 10 thus provides a universal solution which can cover the entire spectrum of possible data transmit/receive devices.

What is claimed is:

1. An analog data generating and processing device (ADGPD), comprising:
   an input/output (i/o) port;
   a program memory;
   a data storage memory;
   a processor operatively interfaced with the i/o port, the program memory and the data storage memory;
   wherein the processor is adapted to implement a data generation process by which analog data is acquired from each respective analog acquisition channel of a plurality of independent analog acquisition channels, the analog data from each respective channel is digitized, coupled into the processor, and is processed by the processor, and the processed and digitized analog data is stored in the data storage memory as at least one file of digitized analog data;
   wherein the processor also is adapted to be involved in an automatic recognition process of a host computer in which, when the i/o port is operatively interfaced with a multi-purpose interface of the host computer, the processor executes at least one instruction set stored in the program memory and thereby causes at least one parameter identifying the analog data generating and processing device, independent of analog data source, as a digital storage device instead of as an analog data generating and processing device to be automatically sent through the i/o port and to the multi-purpose interface of the computer (a) without requiring any end user to load any software onto the computer at any time and (b) without requiring any end user to interact with the computer to set up a file system in the ADGPD at any time, wherein the at least one parameter includes at least one command issued from a customary device driver and where the ADGPD is responsive to said at least one command;
   wherein the at least one parameter provides information to the computer about file transfer characteristics of the ADGPD; and
   wherein the processor is further adapted to be involved in an automatic file transfer process in which, when the i/o port is operatively interfaced with the multi-purpose interface of the computer, and after the at least one parameter has been sent from the i/o port to the multi-purpose interface of the computer, the processor executes at least one other instruction set stored in the program memory to thereby cause the at least one file of digitized analog data acquired from at least one of the plurality of analog acquisition channels to be transferred to the computer using the customary device driver for the digital storage device while causing the analog data generating and processing device to appear to the computer as if it were the digital storage device without requiring any user-loaded file transfer enabling software to be loaded on or installed in the computer at any time.

2. An analog data generating and processing device (ADGPD), comprising:
   an input/output (i/o) interface;
   a program memory;

a data storage memory;

a processor operatively interfaced with the i/o interface, the program memory and the data storage memory;

wherein the processor is adapted to implement a data generation process by which analog data is digitized, coupled into the processor, and is processed by the processor, and the processed and digitized analog data is stored in the data storage memory as at least one file of digitized analog data;

wherein the processor also is adapted to be involved in an automatic recognition process of a host computer in which, when the i/o interface is operatively communicating with a multi-purpose interface of the host computer, the processor executes at least one instruction set stored in the program memory and thereby causes at least one parameter to identify a digital storage device storing the at least one file of digitized analog data adapted to be automatically sent via the i/o interface and to the multi-purpose interface of the host computer (a) without requiring any end user to load any software onto the host computer at any time and (b) without requiring any end user to interact with the computer to set up a file system in the ADGPD at any time, wherein the at least one parameter includes at least one command issued from a customary device driver and where the ADGPD is responsive to said at least one command;

wherein the at least one parameter provides information to the computer about file transfer characteristics of the ADGPD; and wherein the processor is further adapted to be involved in an automatic file transfer process in which, when the i/o interface is operatively communicating with the multi-purpose interface of the host computer, and after the at least one parameter has been sent from the i/o interface to the multi-purpose interface of the host computer, the processor executes at least one other instruction set stored in the program memory to thereby cause the at least one file of digitized analog data to be transferred to the host computer using the customary device driver for the digital storage device without requiring any user-loaded file transfer enabling software to be loaded on or installed in the computer at any time.

3. The ADGPD of claim 2, wherein the i/o interface, the program memory, the data storage memory, and the processor form an interface device.

4. The ADGPD of claim 3, wherein the interface device comprises a portable interface device.

5. The ADGPD of claim 3, wherein the interface device comprises a flexible interface device.

6. The ADGPD of claim 3, wherein the interface device comprises a universal interface device.

7. The ADGPD of claim 3, wherein the interface device comprises a stand alone interface device.

8. The ADGPD of claim 3, wherein the interface device includes a parallel logic circuit.

9. The ADGPD of claim 3, wherein the interface device includes a SCSI interface circuit.

10. The ADGPD of claim 3, wherein the interface device communicates with a hard disk of the host computer while bypassing a processor of the host computer.

11. The ADGPD of claim 2, wherein the i/o interface comprises a parallel port.

12. The ADGPD of claim 2, wherein the i/o interface comprises a SCSI connector.

13. The ADGPD of claim 2, wherein the i/o interface is adapted to communicate with a multi-purpose interface of an external computing device only by means of a cable.

14. The ADGPD of claim 2, wherein the i/o interface is adapted to be physically connected to a multi-purpose interface of an external computing device by a cable.

15. The ADGPD of claim 2, wherein the i/o interface is adapted to communicate with the host computer by signing on and communicating with the host computer as a virtual hard disk.

16. The ADGPD of claim 2, further comprising a sensor that is operatively interfaced with the processor and that is designed to generate the analog data.

17. The ADGPD of claim 16, wherein the processor is designed so that the sensor is detachable therefrom.

18. The ADGPD of claim 16, wherein the processor allows for a plurality of different data transmit devices to be attached thereto and detached therefrom.

19. The ADGPD of claim 16, wherein the sensor is designed to be readily disconnected from the processor.

20. The ADGPD of claim 16, wherein the sensor comprises a data transmit/receive device.

21. The ADGPD of claim 20, wherein the data transmit/receive device is designed for two-way communication with a host device.

22. The ADGPD of claim 20, wherein the data transmit/receive device is designed for one-way or two-way communication with a host device.

23. The ADGPD of claim 20, wherein the data transmit/receive device is designed to receive data from a host device.

24. The ADGPD of claim 2, further comprising a multimeter that is operatively interfaced with the processor and that is designed to generate the analog data.

25. The ADGPD of claim 2, further comprising at least first and second transducers both of which are designed to transmit data and are operatively interfaced with the processor.

26. The ADGPD of claim 2, wherein the at least one parameter is consistent with the ADGPD being an information storage device other than a magnetic floppy disk drive.

27. The ADGPD of claim 2, wherein the at least one parameter is consistent with the ADGPD being a mass storage device.

28. The ADGPD of claim 2, wherein the at least one parameter is consistent with the ADGPD being responsive to a SCSI inquiry command.

29. The ADGPD of claim 2, wherein the at least one parameter is not consistent with the true nature of the ADGPD.

30. The ADGPD of claim 2, wherein the at least one parameter does not indicate that the ADGPD includes a sensor that is designed to generate the analog data.

31. The ADGPD of claim 2, wherein the at least one parameter is consistent with the ADGPD being an input/output device.

32. The ADGPD of claim 2, wherein the at least one parameter is consistent with the ADGPD being an input/output device located within an interior of a housing of a personal computing device.

33. The ADGPD of claim 2, wherein the at least one parameter is consistent with the ADGPD being adapted to operate in a manner consistent with a hard disk drive.

34. The ADGPD of claim 2, wherein the at least one parameter is consistent with the ADGPD being a hard disk drive.

35. The ADGPD of claim 2, wherein the at least one parameter is consistent with the ADGPD being an input/output device that is customary in a host device.

36. The ADGPD of claim 2, wherein the at least one parameter is consistent with the ADGPD being responsive to commands issued from a customary driver.

37. The ADGPD of claim 2, wherein the data storage memory comprises a temporary memory.

38. The ADGPD of claim 2, wherein the data storage memory comprises a semiconductor based memory.

39. The ADGPD of claim 2, wherein the data storage memory comprises random access memory.

40. The ADGPD of claim 2, wherein the data storage memory comprises a single memory device.

41. The ADGPD of claim 2, wherein the program memory comprises electronically programmable read only memory.

42. The ADGPD of claim 2, wherein the processor is adapted to, when the i/o interface is operatively interfaced with the multi-purpose interface of the computer, and after the at least one parameter has been sent to the multi-purpose interface of the computer, execute at least one set of computer code stored in the program memory and thereby cause ADGPD file system information to be automatically sent to the i/o interface (a) without requiring any end user to load any software onto the computer at any time and (b) without requiring any end user to interact with the computer to set up a file system in the ADGPD at any time.

43. The ADGPD of claim 42, wherein the ADGPD file system information comprises at least an indication of the type of a file system that is used to store the at least one file of digitized analog data in the data storage memory.

44. The ADGPD of claim 43, wherein the processor and the program memory are adapted to be configured to cause, after the at least one parameter has been sent to the i/o interface, file allocation table information to be sent to the i/o interface, wherein the processor and the program memory are adapted to be configured to cause a virtual boot sequence to be sent to the i/o interface which includes at least information that is representative of a number of sectors of a storage disk, and wherein the file allocation table information includes at least a start location of a file allocation table.

45. The ADGPD of claim 2, wherein the processor and the program memory are adapted to allow an aspect of operation of the ADGPD other than the transfer of at least some of the at least one file of digitized analog data from the data storage memory to the i/o interface to be controlled by means of an external computer with which the i/o interface is communicating.

46. The ADGPD of claim 2, wherein the processor is adapted to, when said processor is involved in an automatic recognition process, to execute the at least one instruction set to thereby directly cause the at least one parameter regarding the ADGPD to be automatically sent.

47. An analog data generating and processing device (ADGPD), comprising:
an input/output (i/o) interface;
a program memory;
a data storage memory;
a processor operatively interfaced with the i/o interface, the program memory and the data storage memory;
wherein the processor is adapted to be involved in a data generation process by which analog data is generated, the analog data is processed, and the processed analog data is stored in the data storage memory as at least one file of digitized analog data;
wherein the processor also is adapted to be involved in an automatic recognition process in which, when the i/o interface is operatively communicating with a multi-purpose interface of a computer, the processor executes at least one instruction set stored in the program memory and thereby causes at least one parameter to be automatically transmitted via the i/o interface and to the multi-purpose interface of the computer (a) without requiring any end user to load any software onto the computer at any time and (b) without requiring any end user to interact with the computer to set up a file system in the ADGPD at any time;
wherein the at least one parameter provides information that the ADGPD is a mass storage device that operates in a manner consistent with a hard disk drive;
wherein the processor is adapted to, when the i/o interface is operatively communicating with the multi-purpose interface of the computer, and after the at least one parameter has been transmitted to the multi-purpose interface of the computer, execute one or more other instruction sets stored in the program memory and thereby cause ADGPD file system information to be automatically transmitted by way of the i/o interface (a) without requiring any end user to load any software onto the interfaced computing device at any time and (b) without requiring any end user to enter interact with the computer to set up a file system in the ADGPD at any time, the ADGPD file system information comprising at least an indication of the type of a file system that is used to store the at least one file of digitized analog data in the data storage memory;
wherein the processor is further adapted to be involved in an automatic file transfer process in which, when the i/o interface is operatively communicating with the multi-purpose interface of the computer, and after the at least one parameter has been transmitted via the i/o interface to the multi-purpose interface of the computer, the processor executes at least one set of computer code stored in the program memory and thereby causes the at least one file of digitized analog data to be transferred to the computer without requiring any user-loaded file transfer enabling software to be loaded on or installed in the computer at any time;
wherein the processor and the program memory are adapted to be configured to cause, after the at least one parameter has been sent to the i/o interface, file allocation table information to be sent to the i/o interface, the file allocation table information including at least a start location of a file allocation table; and
wherein the processor and the program memory are adapted to be configured to cause a virtual boot sequence to be sent to the i/o interface which includes at least information that is representative of a number of sectors of a storage disk.

48. The ADGPD of claim 47, wherein the at least one parameter is consistent with the ADGPD being a hard disk drive.

* * * * *